United States Patent
Lee et al.

(10) Patent No.: US 8,049,767 B2
(45) Date of Patent: Nov. 1, 2011

(54) IMAGE EDITING METHOD AND APPARATUS THEREOF

(75) Inventors: Chang-woo Lee, Suwon-si (KR);
Yoon-cheol Shin, Seoul (KR);
Soo-young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 749 days.

(21) Appl. No.: 11/839,846

(22) Filed: Aug. 16, 2007

(65) Prior Publication Data
US 2008/0062190 A1 Mar. 13, 2008

(30) Foreign Application Priority Data

Sep. 8, 2006 (KR) .................. 10-2006-0086562

(51) Int. Cl.
*G09G 5/00* (2006.01)
(52) U.S. Cl. ........ 345/619; 382/243; 382/274; 382/305; 382/306; 382/309; 348/231.3; 348/231.6
(58) Field of Classification Search ................. 348/225.1
See application file for complete search history.

(56) References Cited

U.S. PATENT DOCUMENTS

| 7,453,498 B2 * | 11/2008 | Prentice et al. ............ 348/222.1 |
| 7,643,704 B2 * | 1/2010 | Jackson et al. ................ 382/298 |
| 7,697,040 B2 * | 4/2010 | Sorensen et al. .......... 348/231.2 |

FOREIGN PATENT DOCUMENTS

KR 10-2004-0075958 A 8/2004

OTHER PUBLICATIONS

"FlashPix format Specification, version 1.0" Eastman Kodak Company. Sep. 1996. accessed via the web from http://graphcomp.com/info/specs/livepicture/fpx.pdf.*

* cited by examiner

*Primary Examiner* — Antonio Caschera
(74) *Attorney, Agent, or Firm* — Sughrue Mion, PLLC

(57) ABSTRACT

An image editing method includes recording by coding edit information in a predetermined field of an original image frame, and displaying either the original image or an image edited based on the edit information. Accordingly, the edit information is recorded in a blank field of the original frame without damaging the original image, and thus, the image frame can be efficiently stored without wasting storage space.

18 Claims, 3 Drawing Sheets

IMAGE EDITING METHOD AND APPARATUS THEREOF

CROSS-REFERENCE TO RELATED APPLICATIONS

This application claims priority under 35 U.S.C. §119 from Korean Patent Application No. 10-2006-0086562, filed Sep. 8, 2006, in the Korean Intellectual Property Office, the disclosure of which is incorporated herein by reference in its entirety.

BACKGROUND OF THE INVENTION

1. Field of the Invention

Apparatuses and methods consistent with the present invention relate to editing an image, and more particularly, to editing an image in which edit information obtained from an image edited by a user is stored and either an original image or an edited image based on the stored edit information is displayed according to selection by a user during image display.

2. Description of the Related Art

Recently, image capturing apparatuses such as digital cameras and camcorders have become widely distributed. Mobile communication terminals comprising image capturing apparatuses are now commonplace, so that it is easy to capture an image. Additionally, as image capturing apparatuses have been developed, methods for editing images have also diversified.

Such image capturing apparatuses provide various methods for editing an image to enable a user to instantly edit a captured image. Alternatively, it is possible to edit an image in an image display apparatus, such as a television (TV), a plasma display panel (PDP), a computer, or the like, which receives images from an image capturing apparatus, and displays images and provides a method for editing images.

However, in image editing apparatuses such as image capturing apparatuses and image display apparatuses using a conventional method for editing an image, the higher the image resolution, the greater the image quality. Accordingly, image capacity increases, and thus a large storage space is required.

Therefore, if an image is edited and the original image and the edited image are both stored, not only is additional storage space required, but a considerable storage space is wasted. In addition, if only the original image is stored so as not to waste the storage space, it is troublesome to the user, who must edit the image every time he or she wishes to access it. If only the edited image is stored, it is impossible to restore the edited image to the original image when the original image is needed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and an apparatus for editing an image and storing an edited image without wasting storage space.

The present invention also provides a method and an apparatus for editing an image, in which edit information is recorded in a blank field of an original image frame without damaging the original image, so both the original image and edited image are provided.

According to an aspect of the present invention, there is provided an image editing method comprising recording by coding edit information in a predetermined field of an original image frame, and displaying either the original image or an image edited based on the edit information.

In this case, the predetermined field may be a blank field.

Specifically, the recording may comprise detecting the blank field of the original image frame, and recording by coding the edit information in the detected blank field.

The displaying may comprise decoding the edit information coded in the predetermined field and editing the original image based on the decoded edit information.

The edit information may comprise at least one selected from among an edit identification (ID), an editing function, an edit style, and detailed edit information.

The editing function may comprise at least one among a linear processing function to adjust brightness, contrast and color, a frame control function to delete, change the order of and hold a frame, a character insertion function to insert characters and symbols, and a lock function. The edit ID may denote the editing function.

Additionally, the detailed edit information may comprise at least one among a coefficient set according to the edit style, an ASCII code corresponding to the characters to be inserted, a character insertion position, a character size, a character color, a frame number that will be controlled, and a lock password.

The displaying may comprise displaying either the original image or the edited image according to the selection of a user.

According to another aspect of the prevent invention, there is provided an image editing apparatus comprising an editor which codes edit information in a predetermined field of an original image frame to edit the original image frame based on the edit information, and a controller which controls the editor to code and record the edit information in the predetermined field of the original image frame and enables either the original image or the image edited by the editor to be displayed.

In this case, the predetermined field may be a blank field.

Specifically, the editor may detect the blank field of the original image frame, code and record the edit information in the detected blank field.

The editor may decode the edit information coded in the predetermined field and edit the original image based on the decoded edit information.

The edit information may comprise at least one selected from among an edit ID, an editing function, an edit style, and detailed edit information.

The editing function may comprise at least one among a linear processing function to adjust brightness, contrast and color, a frame control function to delete, change the order of and hold a frame, a character insertion function to insert characters and symbols, and a lock function. The edit ID may denote the editing function.

Additionally, the detailed edit information may comprise at least one among a coefficient set according to the edit style, an ASCII code corresponding to the characters to be inserted, a character insertion position, a character size, a character color, a frame number that will be controlled, and a lock password.

The controller may display either the original image or the edited image according to the selection of a user.

At this time, the image editing apparatus may comprise an image capturing apparatus such as a digital camera and a camcorder, and an image display apparatus, such as a TV, a PDP, and a computer.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
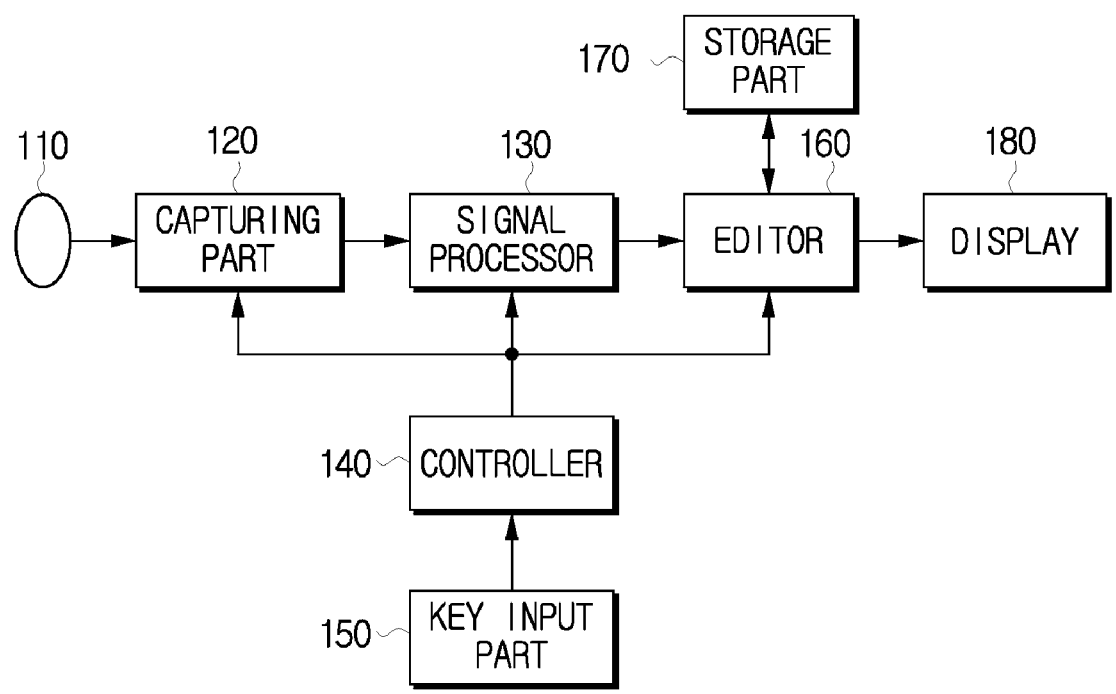
FIG. 1 is a block diagram of an image editing apparatus according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present invention. Thus, it is apparent that the present invention can be carried out without those specifically defined matters. Also, well-known functions or constructions are not described in detail since they would obscure the invention with unnecessary detail.

FIG. 1 is a block diagram of an image editing apparatus according to an exemplary embodiment of the present invention.

The present image editing apparatus stores an edited image without wasting storage space. The present image editing apparatus records edit information in a blank field of an original image frame without damaging an original image, and accordingly records the edit information regarding the edited image without wasting storage space and provides both the original image and the edited image.

In FIG. 1, the present image editing apparatus comprises a lens 110, a capturing part 120, a signal processor 130, a controller 140, a key input part 150, an editor 160, a storage part 170, and a display 180.

The capturing part 120 converts an optical image formed through the lens 110 to an electrical signal, removes signal noise, adjusts gain, and then converts the electrical signal to a digital signal. The signal processor 130 processes the digital signal transmitted from the capturing part 120, and outputs the processed image signal to the display 180 described below.

The controller 140 controls the capturing part 120 and the signal processor 130 so that the captured image is displayed on the display 180. If an edit command is inputted through the key input part 150 in order to edit the image displayed on the display 180, the controller 140 controls the editor 160 so as to edit the image according to the inputted edit command.

The key input part 150 comprises keys for selecting an edit menu and various editing features, such as brightness, contrast and color adjustments, mosaic processing, softening or the like which are contained in the edit menu, and for adjusting a level of the selected editing function. Additionally, the key input part 150 comprises a key for inputting a text onto an image.

With respect to the image signal received from the signal processor 130, the editor 160 detects a blank field of an original image frame that was edited by a user. The blank field indicates a remaining field where there is no image data in the image frame. The editor 160 codes edit information into an 8-bit compression data in the detected blank field of the original image frame that was edited, and then the compression data is stored in the storage part 170. The edit information indicates what kind of editing function is performed on the image frame that was edited.

Table 1 shows an example of the edit information coded in the blank field by the editor 160.

TABLE 1

| Edit ID | Function | Edit Style | Edit Info. |
|---|---|---|---|
| 0 | No Function | 0 | — |
| 1 | Linear Processing | 0 - Add<br>1 - Subtract<br>2 - Multiply | Coefficient |
| 2 | Character Insertion | X - coordinate<br>Y - coordinate | ASCII code |
| 3 | Frame Control | 0 - Delete<br>1 - Change<br>2 - Hold | Frame Number |
| 4 | Image Lock | — | Password Key |

As shown in Table 1, the edit information comprises "edit ID", editing "function", "edit style", and detailed "edit information". At this time, the "edit ID" indicates editing functions which are performed, the "edit style" indicates a style of editing which is performed, and the detailed "edit information" indicates detailed information corresponding to the "edit style".

Specifically, if the "edit ID" is 0, no function is performed, and thus there are no "edit style" and "edit information".

If the "edit ID" is 1, a linear processing such as brightness, contrast and color adjustments is performed. At this time, linear addition is performed if the "edit style" is set to 0, linear subtraction is performed if the "edit style" is set to 1, and multiplication is performed if the "edit style" is set to 2. In addition, the detailed "edit information" indicates a coefficient determined by the linear processing.

If the "edit ID" is 2, it is shown that a "character insertion" function is started to insert characters or symbols, and the "edit style" represents a position, that is, an X-coordinate and a Y-coordinate, in which characters are inserted. The detailed "edit information" indicates an ASCII code value corresponding to the inserted characters, and the size, color, font value or the like of the inserted characters.

If the "edit ID" is 3, it can be seen that a "frame control" function is started. A "delete" function deletes a frame if the "edit style" is set to 0, a "change" function changes the display order of a frame if the "edit style" is set to 1, and a "hold" function continuously stores a frame if the "edit style" is set to 2. The detailed "edit information" indicates a "frame number" indicating the order of the edited frame.

Additionally, if the "edit ID" is 4, an "image lock" function is performed, and the detailed "edit information" represents a "password key" capable of unlocking an image.

For example, if a user selects a "frame lock" function through the key input part 150 and inputs a password, the editor 160 codes 4 as the "edit ID" and a password as the detailed "edit information" in the blank field of the original image frame that will be locked, compresses the coded information, and then stores the compressed information in the storage part 170.

The storage part 170 stores the original image processed by the signal processor 130, and the edit information coded in the blank field of the original image frame. The display 180 displays either the original image or the edited image according to a selection by the user.

Figure 2:
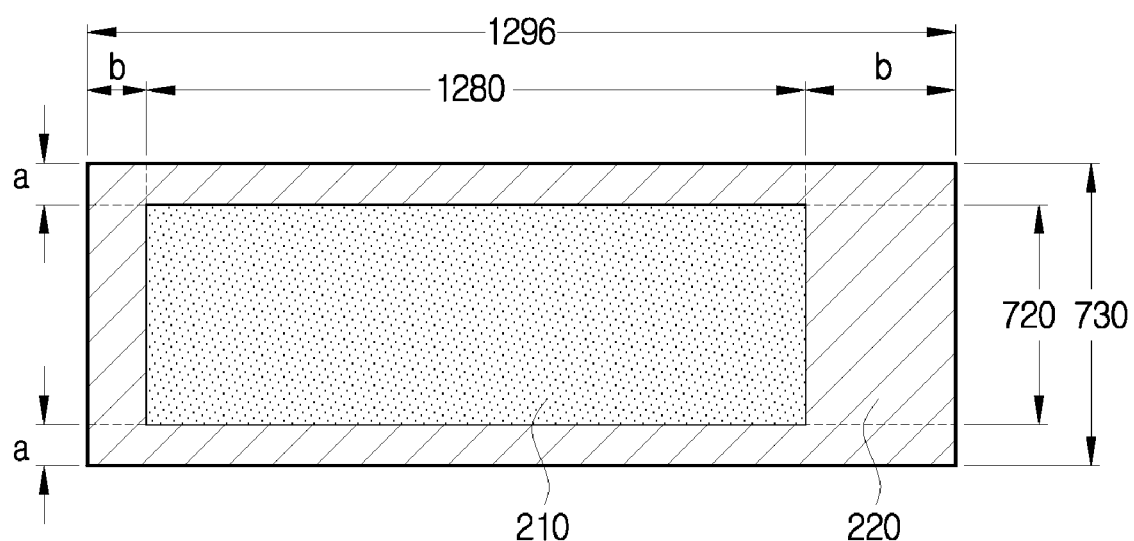
FIG. 2 is a view illustrating the structure of an image frame according to an exemplary embodiment of the present invention.

FIG. 2 is a view illustrating the structure of an image frame according to an exemplary embodiment of the present invention.

FIG. 2 illustrates an image frame having a resolution of 1280×720. Actually, the image frame may have a resolution of 1296×730 while being stored in the storage part 170. The image frame comprises a valid data field 210 (dotted region) containing practical image data, and a blank field 220 (hashed region) not containing practical image data.

The blank field 220 is divided into a vertical (V)-blank field a and a horizontal (H)-blank field b. The editor 160 codes edit information, and then records the coded information in the blank field 220 regardless of the V-blank field a and the H-blank field b.

Figure 3:
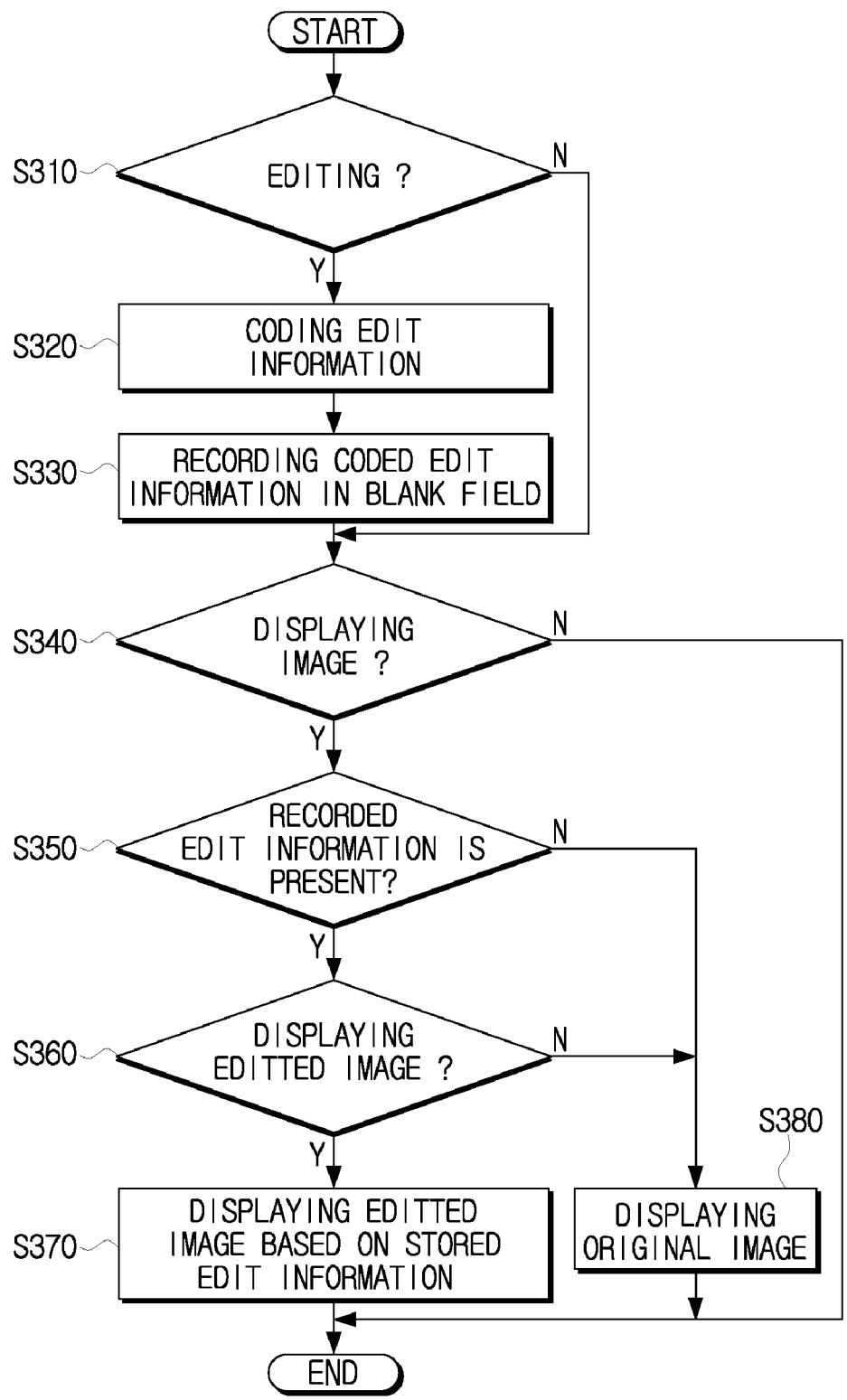
FIG. 3 is a flowchart explaining an image editing method of an image editing apparatus according to an exemplary embodiment of the present invention.

FIG. 3 is a flowchart explaining an image editing method of an image editing apparatus according to an exemplary embodiment of the present invention.

In FIG. 3, the controller 140 determines whether an editing-related command is received through the key input part 150 by a user (S310).

If it is determined that the editing-related command is received (S310-Y), the controller 140 controls the editor 160 to code edit information corresponding to the editing-related command in the blank field of the original image frame which receives the editing-related command from a user (S320).

The editor 160 records the coded edit information in the blank field of the original image frame and stores the recorded image frame in the storage part 170 (S330).

After the recorded image frame is stored (S330) or if it is determined that the editing-related command is not received (S310-N), the controller 140 determines whether a display command of the stored image is received (S340). If it is determined that the display command is not received (S340-N), the image editing method ends.

If it is determined that the display command is received (S340-Y), the controller 140 determines whether the edit information recorded in the original image frame to be displayed (S350) is present. Specifically, when displaying the image stored in the storage part 170, the editor 160 detects the blank field of the image frame stored in the storage part 170, determines whether the edit information is recorded in the detected blank field, and outputs the determination result to the controller 140. The controller 140 determines whether the edit information recorded in the original image frame to be displayed is present, according to the determination result transmitted from the editor 160.

If it is determined that the recorded edit information is present (S350-Y), the controller 140 asks a user through the display 180 whether he or she wants to display the edited image, and then determines whether the edited image is displayed according to the selection of the user through the key input part 150 (S360).

If it is determined that the user chooses to display the edited image (S360-Y), the controller 140 controls the editor 160 to display the edited image based on the stored edit information (S370). In this case, the editor 160 decodes the edit information coded in the blank field, edits the original image based on the decoded edit information, and then displays the edited original image, that is, the edited image on the display 180.

If it is determined that the recorded edit information is not present (S350-N) in operation S350, or if it is determined that the user selects not to display the edited image (S360-N) in operation S360, the controller 140 displays the original image stored in the storage part 170 on the display 180 (S380).

As described above, according to the exemplary embodiment of the present invention, the edit information is recorded in the blank field of the original frame without damaging the original image. Therefore, the image frame can be efficiently stored without wasting storage space.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative only, and not to limit the scope of the claims, as many alternatives, modifications, and variations will be apparent to those skilled in the art. Therefore, the scope of the present invention should be defined by the appended claims and their equivalents.

What is claimed is:

1. An image editing method comprising:
    coding and recording, by an image editing apparatus, edit information in a field of an original image frame;
    storing, by the image editing apparatus, the original image frame with the edit information recorded in the field without storing an edited image frame; and
    displaying, by the image editing apparatus, an original image or an image which is edited based on the edit information prior to displaying,
    wherein the original image frame comprises a data field which is filled with an image data,
    the field is a blank field in the original image frame not filled with the image data, and
    the blank field is located in the original image frame at an area which is not occupied by the data field.

2. The method as claimed in claim 1, wherein the coding and recording comprises detecting the blank field of the original image frame, coding the edit information, and recording the coded edit information in the detected blank field.

3. The method as claimed in claim 1, wherein the displaying comprises decoding the edit information coded in the field and editing the original image based on the decoded edit information.

4. The method as claimed in claim 1, wherein the edit information comprises at least one of an edit identification (ID), a type of an editing function, an edit style, and detailed edit information.

5. The method as claimed in claim 4, wherein the edit information comprises the edit ID and the type of the editing function which comprises at least one of a linear processing function to adjust brightness, contrast and color; a frame control function to delete, change the order of and hold a frame; a character insertion function to insert characters and symbols; and a lock function, and
    wherein the edit ID denotes one of no editing function performed and the type of the editing function performed.

6. The method as claimed in claim 5, wherein the edit information further comprises the edit style and the detailed edit information which comprises at least one of a coefficient set according to the edit style; an ASCII code corresponding to the characters to be inserted and at least one of a character insertion position, a character size, and a character color of the characters to be inserted; a frame number that will be controlled; and a lock password.

7. The method as claimed in claim 1, wherein the displaying comprises displaying either the original image or the edited image according to a selection by a user.

8. The method as claimed in claim 1, further comprising:
receiving a command;
editing the original image based on the edit information in response to the receiving the command; and
displaying the edited image.

9. The method as claimed in claim 1, wherein the original image frame corresponds to a frame of predetermined resolution displayable on a display device.

10. An image editing apparatus comprising:
an editor which codes and records edit information in a field of an original image frame to edit the original image frame based on the edit information;
a storage in which the original image frame is stored together with the recorded edit information without storing an edited image frame; and
a controller which controls the editor to code and record the edit information in the field of the original image frame and enables either an original image or an image edited by the editor based on the edit information to be displayed,
wherein the original image frame comprises a data field which is filled with an image data,
the field is a blank field in the original image frame not filled with the image data, and
the blank field is located in the original image frame at an area which is not occupied by the data field.

11. The apparatus as claimed in claim 10, wherein the editor detects the blank field of the original image frame, and codes and records the edit information in the detected blank field.

12. The apparatus as claimed in claim 10, wherein the editor decodes the edit information coded in the field and edits the original image based on the decoded edit information.

13. The apparatus as claimed in claim 10, wherein the edit information comprises at least one of an edit identification (ID), a type of an editing function, an edit style, and detailed edit information.

14. The apparatus as claimed in claim 13, wherein the edit information comprises the edit ID and the type of the editing function which comprises at least one of a linear processing function to adjust brightness, contrast and color; a frame control function to delete, change the order of and hold a frame; a character insertion function to insert characters and symbols; and a lock function, and
wherein the edit ID denotes one of no editing function performed and the type of the editing function performed.

15. The apparatus as claimed in claim 14, wherein the edit information further comprises the edit style and the detailed edit information which comprises at least one of a coefficient set according to the edit style; an ASCII code corresponding to the characters to be inserted and at least one of a character insertion position, a character size, and a character color of the characters to be inserted; a frame number that will be controlled; and a lock password.

16. The apparatus as claimed in claim 10, wherein the controller displays either the original image or the edited image according to a selection by a user.

17. The apparatus as claimed in claim 10, wherein the image editing apparatus
is embodied in one of an image capturing apparatus, and an image display apparatus.

18. The apparatus as claimed in claim 17, wherein the image capturing apparatus comprises one of a digital camera and a camcorder, and the image display apparatus comprises one of a television (TV), a plasma display panel (PDP), and a computer.

* * * * *